United States Patent [19]
Hayashi

[11] 3,949,414
[45] Apr. 6, 1976

[54] GAIN CONTROL DEVICE OF VIDEO SIGNAL REPRODUCING APPARATUS

[75] Inventor: Hiroyuki Hayashi, Hon, Japan
[73] Assignee: Sony Corporation, Tokyo, Japan
[22] Filed: June 4, 1974
[21] Appl. No.: 476,277

[30] Foreign Application Priority Data
June 8, 1973 Japan............................... 48-64578

[52] U.S. Cl.................................. 358/8; 358/27
[51] Int. Cl.² ..................... H04N 5/76; H04N 9/535
[58] Field of Search .................. 358/8, 9, 4, 35, 27; 360/33, 27, 46; 178/6.6 HS

[56] References Cited
UNITED STATES PATENTS

| | | | |
|---|---|---|---|
| 3,381,083 | 4/1968 | Jensen et al. ............................. | 358/8 |
| 3,501,585 | 3/1970 | De Lange ............................. | 360/33 |
| 3,541,237 | 11/1970 | Dillenburger ......................... | 358/8 |
| 3,585,280 | 6/1971 | McMann, Jr. .......................... | 358/7 |
| 3,702,374 | 11/1972 | Numakura ............................. | 358/8 |
| 3,717,721 | 2/1973 | Makara et al. .......................... | 358/8 |
| 3,732,361 | 5/1973 | Makara ................................. | 358/4 |
| 3,852,808 | 12/1974 | Sadashige ............................. | 358/8 |

Primary Examiner—Robert L. Griffin
Assistant Examiner—R. John Godfrey
Attorney, Agent, or Firm—Lewis H. Eslinger; Alvin Sinderbrand

[57] ABSTRACT

A gain control circuit for a video signal reproducing apparatus provides a variable gain circuit in the reproduced video signal path and an amplitude detector circuit to which a pilot signal separated from the reproduced video signals is applied. The gain control circuit has N series circuits, each consisting of a series-connected capacitor and a switching element, each of the series circuits corresponding to one of the transducers of the video signal reproducing apparatus. The series circuits are connected to form a parallel circuit across which is applied an output signal from the amplitude detector circuit to supply a gain control signal to the variable gain circuit. Further, each switching element of the series circuits is controlled to be conductive only during the intervals during which a reproduced video signal is obtained from a corresponding rotary head.

4 Claims, 8 Drawing Figures

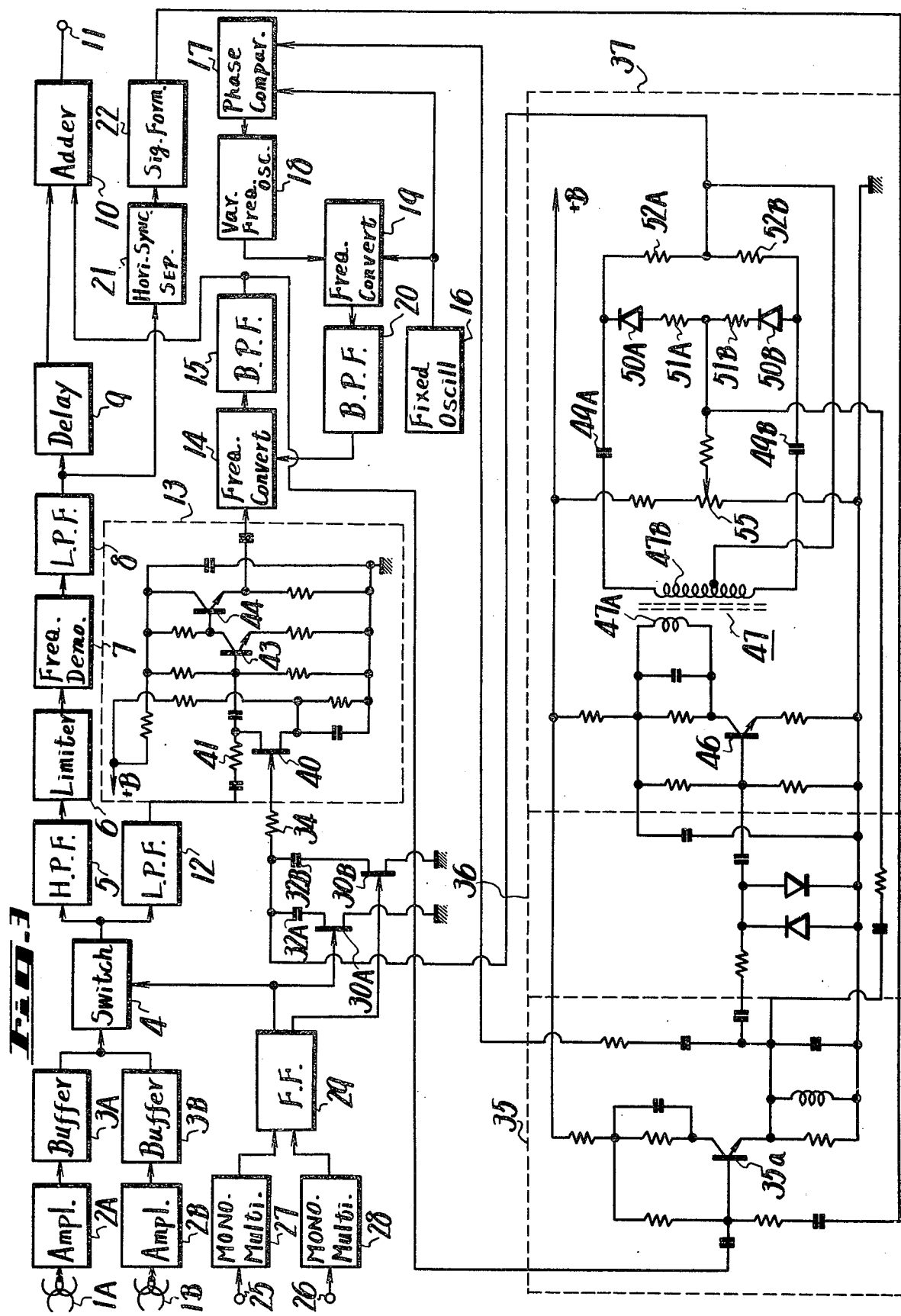

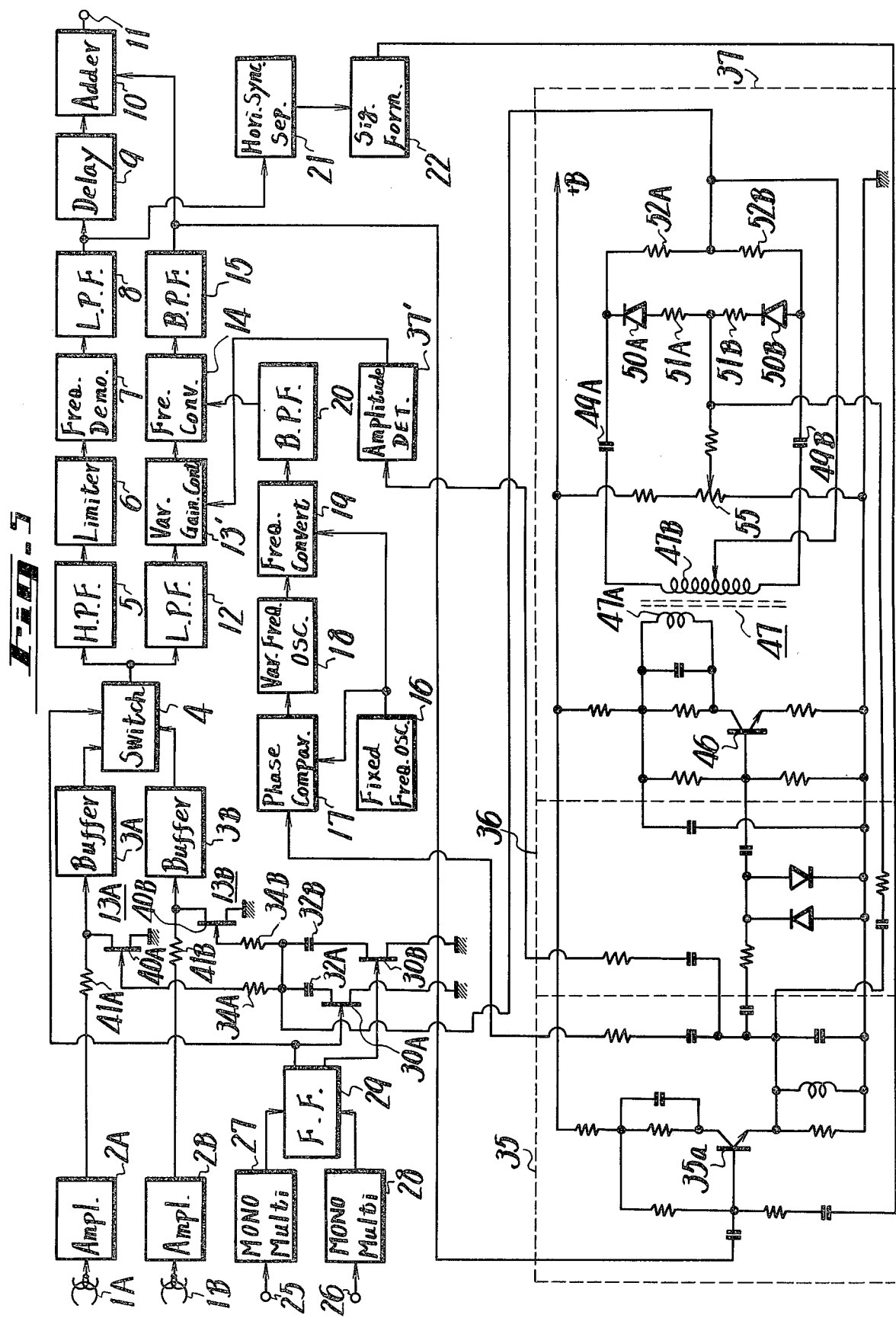

GAIN CONTROL DEVICE OF VIDEO SIGNAL REPRODUCING APPARATUS

BACKGROUND OF THE INVENTION

1. Field of the Invention

This invention relates to a gain control circuit of a video signal reproducing apparatus and particularly to a gain control circuit suitable for use in an automatic color control circuit of a color video signal reproducing apparatus.

2. Description of the Prior Art

There has hitherto been proposed a color video tape recording having, for example, two rotary magnetic heads by means of which every field of a color video signal is recorded in such a way that each magnetic tracks corresponds to one field, and the tracks are formed alternately by first one of the heads and then the other on a magnetic tape. Each track extends obliquely to the longitudinal direction of the tape. During playback, every field of a color video signal is reproduced by these heads, alternatively, from the magnetic track of each field. In a color video tape recorder of this kind, the level of the chrominance signal in the reproduced signal is sometimes diferent between these heads due to irregular characteristics of the heads, unequal characteristics of amplifying systems supplied with signals from the individual heads, uneven contact with the tape, or the like. When a color video signal having such a chrominance signal with the variable level is applied to a television receiver for producing a picture, an undesirable color flicker is produced in the reproduced picture.

It has already been known to provide a variable gain circuit in the transmitting path of reproduced chrominance signals and to control the gain of the circuit according to the level of burst signals separated from the chrominance signals to make the levels of the reproduced chrominance signals constant.

It has also previously been proposed to obtain a constant level of chrominance signals by applying a burst signal to an amplitude detector circuit, such as a synchronous detector circuit, to derive a detected output which is applied to a hold circuit.

The output signal of this hold circuit is then applied to the variable gain circuit as a gain control signal. In this case, the level variation of the chrominance signal during each field from each rotary head is removed, but another drawback is produced. The level of the chrominance signal in each field is made constant but when the level is different for every rotary head, the output signals of the hold circuit corresponding to each rotary head provide slanting rise and decay portions at the beginning and end of each field. As a result, the reproduced chrominance signals are varied by the variable gain circuit in such a manner that the level during every field is made constant except at the beginning and end of each of the fields. This is caused by the fact that since a burst signal is provided at every horizontal period, the response to variable gain cannot be speeded up and, in practice, is further delayed due to noise or the like.

SUMMARY OF THE INVENTION

Accordingly, a main object of this invention is to provide a gain control circuit for video signal reproducing apparatus in which the level variation of video signals reproduced from different transducers can be positively removed.

Another object of this invention is to provide a gain control circuit for video signal reproducing apparatus in which pulse rise and decay times of an output signal corresponding to each transducer are substantially zero.

A further object of this invention is to provide a gain control circuit for color video signal reproducing apparatus in which even though the reproduced chrominance signal is rapidly changed in level, it is corrected to have a constant level so that color shading in the reproduced picture may be avoided.

A still further object of this invention is to provide a gain control circuit for color video signal reproducing apparatus in which not only the chrominance signal from each transducer is made constant in level but also the luminance signal is made constant in level.

A further object of this invention is to provide a gain control circuit for color video signal reproducing apparatus in which the occurrence of color flicker in a reproduced picture is positively eliminated to obtain reproduced color picture of good quality.

A still further object of this invention is to provide a gain control circuit for video signal reproducing apparatus such that does not require particularly complicated operation or construction.

Other objects, features and advantages of the present invention will be apparent from the following description taken in conjunction with the accompanying drawings.

BRIEF DESCRIPTION OF THE DRAWINGS

FIG. 3 is a schematic circuit diagram showing one embodiment of the invention;

FIG. 5 is a schematic circuit diagram showing another embodiment of the invention.

DESCRIPTION OF THE PREFERRED EMBODIMENT

Figure 1A:
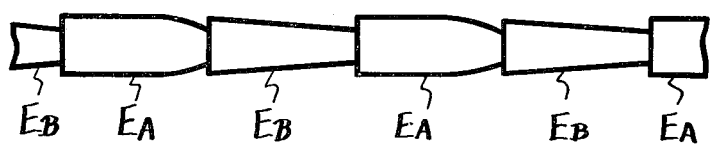
FIGS. 1 and 2 show signal waveforms and envelopes for explaining the invention.

FIG. 1A shows a signal envelope typical of the case when the contact between the heads and the tape is irregular. The unequal envelopes of chrominance signals $E_A$ and $E_B$ reproduced from two rotary heads shown in FIG. 1A correspond to the level fluctuation that appears at every field in the respective signals.

Figure 1B:
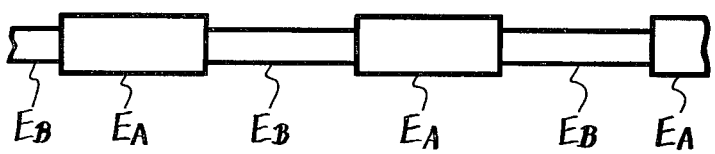

In the case when the sensitivity characteristics of two rotary heads or those of the respective amplifying systems are not uniform, the envelopes of the respective chrominance signals $E_A$ and $E_B$ reproduced from these rotary heads are shown in FIG. 1B, wherein the respective signals $E_A$ and $E_B$ have different levels, but each level is constant in each field.

These adverse effects are very often complicated. For example, the envelopes of the chrominance signals $E_A$ and $E_B$ reproduced from two rotary heads as shown in FIG. 1C represent the combined effects resulting from the causes that produce the envelopes of FIGS. 1A and 1B.

Figure 1C:
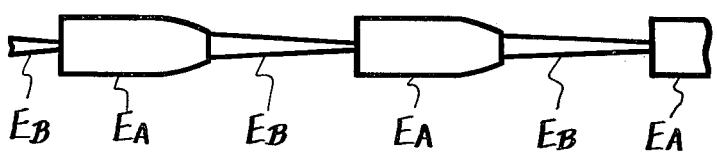
Figure 2A:
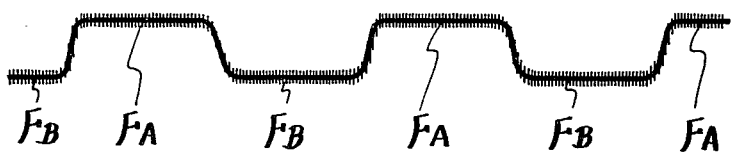
Figure 2B:
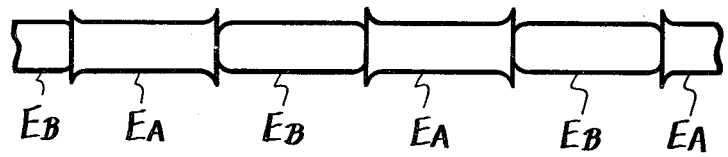

However, in order to eliminate the type of level variation of the chrominance signals as shown in FIG. 1C, the response speed of gain variation in the variable gain circuit must be quite high, and the desired performance is difficult to obtain.

Figure 4:
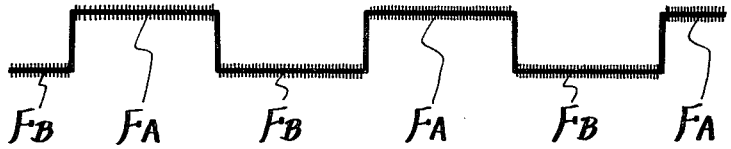
FIG. 4 is a waveform diagram used for explaining the embodiment of the invention shown in FIG. 3.

A description will hereinafter be given on one embodiment of this invention with reference to FIGS. 3 and 4.

In FIG. 3, rotary magnetic heads 1A and 1B are disposed 180° apart to reproduce color video signals alternately from a magnetic tape at every field. These reproduced signals are supplied, respectively, through reproduction amplifiers 2A and 2B and further through buffer amplifiers 3A and 3B to a switching circuit 4. The changed-over output signal from the switching circuit 4 is applied to a high-pass filter 5. The high-frequency component of the reproduced signal is a frequency-modulated luminance signal, which passes through the filter 5 to a limiter circuit 6 and from there to a frequency demodulator 7 to be demodulated. The demodulated output signal is then applied through a low-pass filter 8 and a delay line 9 to an adder 10. The changed-over output from the switching circuit 4 is also applied to a low-pass filter 12 to obtain a chrominance signal that was frequency-converted to a lower frequency band during recording to have a carrier frequency substantially lower than the original 3.58MHz, for example, 767KHz. The frequency-converted chrominance signal from the filter 12 is applied through a variable gain circuit 13 to a frequency converter circuit 14. A signal having a frequency of 3.58MHz from a fixed frequency oscillator 16 and a signal having a frequency $f_c$ from a variable frequency oscillator 18 are applied to a frequency converter circuit 19 to derive therefrom a signal having a frequency of (3.58MHz +$f_c$). This signal is applied through a band-pass filter 20 to the frequency converter circuit 14 to reconvert the chrominance signal to the original frequency, that is to a band having a color subcarrier frequency of 3.58 MHz. The reconverted chrominance signal is applied through a band-pass filter 15 to the adder 10.

The output from the band-pass filter 15 is also applied to the base of a transistor 35a forming a burst gate circuit 35 and the output from the low-pass filter 8 is also applied to a horizontal synchronizing signal separation circuit 21 to separate a horizontal synchronizing signal from other luminance signal components. This horizontal synchronizing signal is applied to a signal forming circuit 22 to form a burst signal gating signal which is applied to the base of the transistor 35a, too. A burst signal from the burst gate circuit 35 is applied to a phase comparison circuit 17 to be compared with the phase of the signal having the reference frequency of 3.58MHz from the ooscillator 16. The resulting DC output of the comparator 17 is used to control the oscillation frequency of the oscillator 18 and hence the frequency of the frequency converting signal which is applied from the frequency converter circuit 19 through the band-pass filter 20 to the circuit 14. Thus a so-called jitter correction is performed.

The variable gain circuit 13 in this embodiment is composed of a two-stage amplifier circuit having transistors 43 and 44 and a variable attenuator consisting of a resistor 41 and a variable impedance field effect transistor 40. The variable attenuator is provided at the input side of the first-stage transistor 43.

A series circuit consisting of a capacitor 32A and a field effect transistor 30A functioning as a switching element and another series circuit consisting of a capacitor 32B and a field effect transistor 30B also functioning as a switching element are connected in parallel with each other, the resulting parallel circuit being connected at one end through a resistor 34 to the gate of the field effect transistor 40 of the circuit 13 and at the other end to ground.

These field effect transistors 30A and 30B to the rotary magnetic heads 1A and 1B, respectively, each being controlled to be turned on only during the period where a reproduced video signal is being derived from the respective rotary magnetic head 1A or 1B. To this end, according to the rotation of the rotary magnetic heads 1A and 1B, two oppositely polarized pulse signals are obtained during each revolution and are supplied to input terminals 25 and 26, respectively. These pulse signals are respectively applied to monostable multivibrators 27 and 28 to be delayed for a predetermined time so as to correspond to the signal change-over times of the rotary magnetic heads 1A and 1B. The delayed signals are applied to a flip-flop circuit 29 to produce output signals having polarities different from each other, which are then applied to the bases of the field effect transistors 30A and 30B, respectively, to cause the latter transistors to conduct alternately. In this case, one of the output signals from the flip-flop circuit 29 is supplied to the switching circuit 4 as a switching control signal.

The burst signal from the burst gate circuit 35 is also applied to a limiter circuit 36 serving as a wave shaping circuit to produce a rectangular-wave signal having constant amplitude to be applied as a control signal or a gate signal to a synchronous detector circuit 37 serving as an amplitude detector circuit.

The detector circuit 37 comprises an amplifying transistor 46 to which a signal from the limiter circuit 36 is applied, a transformer 47 that has a primary winding 47A connected to the collector of the transistor 46 and a secondary winding 47B. A first series circuit consisting of a capacitor 49A, a diode 50A, a resistor 51A, a resistor 51B, a diode 50B and a capacitor 49B is connected across the secondary 47B. A second series circuit consisting of resistors 52A and 52B is connected between the common connection point of the capacitor 49A and the diode 50A and the common connection point of the diode 50B and the capacitor 49B. The common connection point of the resistors 51A and 51B is applied with a direct bias voltage from a variable resistor 55 and with the burst signal from the burst gate circuit 35. Further, the point of the secondary winding 47B of the transformer 47 is connected to the common connection point between the resistors 52A and 52B.

The output of the detector circuit 37 is derived from the common connection point of the resistors 52A and 52B, and is applied across the parallel circuit consisting of the series circuit of capacitor 32A and field effect transistor 30A and the series circuit of capacitor 32B and field effect transistor 30B. Reference character +B represents a power source.

A description will next be given of the operation and effect of the apparatus shown in FIG. 3. The field effect transistors 30A and 30B each serving as a switching element are turned on only during the respective periods when the reproduced video signal is being derived from the corresponding rotary magnetic head 1A or 1B. On the other hand, the opposite ends of the secondary winding 47B of the transformer 47 are alternately inverted in polarity based on the outputs of the primary winding 47A. When the end of the secondary winding 47B connected to the capacitor 49B becomes positive in polarity, a signal flows through a loop consisting of the winding 47B — capacitor 49B — diode 50B — resistor 51B — resistor 51A — diode 50A — capacitor 49A — secondary winding 47B, so that the diodes 50A and 50B are turned on only during the period of half cycle of the signal. Therefore, if the transformer 47 is so connected, the half cycle period during which the diodes 50A and 50B are conductive can be conformed with, for example, the positive half cycle of each oscillation of the burst signal. Accordingly, in this case, a portion of this burst signal during each positive half cycle flows through two paths of the burst gate circuit 35 — resistors 51A, 51B — diodes 50A, 50B — capacitors 49A, 49B — middle point of secondary winding 47B to charge the capacitor 32A or 32B up to the peak value of the burst signal. The voltage across the capacitor 32A or 32B is then applied through the resistor 34 to the gate of the field effect transistor 40 of the variable gain circuit 13. In this case, when the field effect transistors 30A and 30B are non-conductive, the voltages across the corresponding capacitors 32A and 32B are held at the same values as immediately before they were made non-conductive. As a result, a variable control signal applied to the field effect transistor 40 becomes as shown in FIG. 4 so that the sloping transitional edges at the pulse rising and falling portions between the output signals $F_A$ and $F_B$ corresponding to the respective rotary magnetic heads become nearly instantaneous. Accordingly, the chrominance signal derived from the variable gain circuit 13 (that is, the chrominance signal converted into low frequency) will have a constant level independent of the difference of the rotary magnetic heads 1A and 1B. Thus, even if video signals reproduced from the rotary magnetic heads 1A and 1B, that is, the chrominance signals in this case, have level variations as shown in FIG. 1, the variable gain circuit 13 can yield chrominance signals that have constant levels and cause no transient peaks at a time point point when the signals from the respective rotary magnetic heads 1A and 1B are changed-over.

Furthermore, according to the present apparatus, the diodes 50A and 50B are turned on based on the constant amplitude signal derived from the limiter circuit 36, and a portion of the burst signal during, for example, a positive half cycle is picked out according to these conductive diodes 50A and 50B. Therefore, a variable gain control signal with a short rise time can be obtained without any time lag due to the threshold level of the diodes 50A and 50B and without any influence of delayed operation of the diodes 50A and 50B themselves. As a result, even if a reproduced chrominance signal changes level rapidly, the signal can be have a corrected to be constant level with the result that there is no possibility of producing color shading on the reproduced picture.

In addition, the phase conformability between the signal derived from the limiter circuit 36 and the burst signal can be achieved only by adjusting the transformer 47 particularly with no complicated operation being required and with a simple construction, too.

The variable gain circuit 13 in FIG. 3 may be provided at the output side of the band-pass filter 15. In this case, the level of a chrominance signal having carrier frequency reconverted to the original value 3.58MHz will be made constant.

The apparatus in FIG. 3 is described on the basis that the variable gain circuit is provided in the transmitting path of chrominance signals. However, it is also possible to provide variable gain circuits in transmitting paths of video signals which are reproduced from the rotary magnetic heads 1A and 1B but not separated as yet into luminance signals and chrominance signals. The above example will be described with reference to FIG. 5, in which elements corresponding to those of FIG. 3 have the same reference members and the repeated description is omitted. In an apparatus of this embodiment, at the input sides of the buffer amplifiers 3A and 3B there are respectively connected variable attenuators each consisting of a resistor 41A or 41B and a field effect transistor 40A or 40B that serves as a variable impedance element thereby to form variable gain circuits 13A and 13B. One end of the parallel circuit consisting of the series connection of capacitor 32A and field effect transistor 30A and the other series connection of capacitor 32B and field effect transistor 30B is connected through resistors 34A and 34B to the gates of the field effect transistors 40A and 40B while the other is connected to ground.

In this embodiment, another variable gain circuit 13' other than the above-mentioned variable gain circuits 13A and 13B is provided in the transmitting path of chrominance signals, while the burst signal from the burst gate circuit 35 is applied to an amplitude detector circuit 37' to perform the amplitude detection. The detected output signal from the circuit 37' is applied to the variable gain circuit 13' as a variable gain control signal. However, these circuits may also be omitted.

With the apparatus of FIG. 5, there is an advantage in that the luminance signals (or frequency-modulated luminance signals in this case) from the respective rotary magnetic heads 1A and 1B are also made constant in level in addition to the fact that the chrominance signals from these heads are made constant in level.

In the respective embodiments described above, the video signal reproducing apparatus has provided therein two rotary heads (N = 2). However, the number N may be 3 or more and the number of the series circuits each consisting of a capacitor and a switching element, is accordingly increased. Besides, the switching element is not limited to a field effect transistor but various kinds of switching element such as a bipolar transistor or the like are also applicable thereto. The amplitude detector circuit is also not limited to the synchronous detector circuit.

According to the invention described above, the video signal reproducing apparatus having more than two rotary heads comprises a variable gain circuit provided in a transmitting path of reproduced video signals from each of the rotary heads, an amplitude detector circuit to which a pilot signal separated from the reproduced video signals is applied, and the same number of series circuits each consisting of series-connected capacitor and switching element, as the number of the rotary heads. The output voltage of the amplitude detector circuit is impressed between both ends of a parallel circuit consisting of the same number of the series circuits as the number of rotary heads to derive an output signal which is supplied to the variable gain circuit as a variable gain control signal, and the switching elements of the series circuits are respectively controlled so as to be turned on only during a period where a reproduced video signal is obtained from a corresponding rotary head. Accordingly, in the video signal reproducing apparatus having N rotary heads, even though the reproduced video signals from the rotary heads are varied in level, continuous reproduced video signals having constant level can be obtained by removing the level fluctuation automatically. Further, the occurence of color flicker is positively eliminated in the reproduced video signals or, if the signals are chrominance signals, in the reproduced pictures. As a result, it is possible to provide a reproduced color picture of good quality.

While the principles of the invention have been described above in connection with specific embodiments, and particular modifications thereof, it is to be clearly understood that this description is made only by way of example and not as a limitation on the scope of invention.

I claim as my invention:

1. A gain control circuit for a video signal reproducing apparatus comprising a plurality of transducers to reproduce recorded video signals, said circuit comprising:
    A. a plurality of variable gain circuits each connected to a respective one of said transducers to receive reproduced video signals therefrom;
    B. means to separate a predetermined signal from the reproduced video signals;
    C. an amplitude detector circuit connected to the signal separating means; and
    D. a plurality of series circuits corresponding in number to the number of said transducers and each comprising a capacitor and a switching element connected in series, all of the series circuits being connected in parallel to a common junction to form a parallel circuit, said common junction being connected to the output of the amplitude detector circuit to have the output voltage of the detector circuit impressed across the parallel circuit, said common junction being further connected to all of the variable gain circuits to simultaneously suppply said detector circuit output to all of said variable gain circuits to control the gains thereof, and means for selectively energizing each switching element in each of the series circuits to cause each of the series circuits to be conductive only when a reproduced video signal from the respective transducer corresponding to the series circuit is applied to the respective variable gain circuit so that the voltage at said common junction is substantially the same during transition intervals between respective transducer outputs.

2. The gain control circuit of claim 1 in which each of the switching elements is a field-effect transistor.

3. The gain control circuit of claim 1 comprising filter means connected to receive output signals from the gain control circuits and to separate the video signals from the gain control circuits into a luminance signal and a chrominance signal.

4. The gain control circuit of claim 1 comprising a filter circuit connected between the transducers and the respective variable gain circuits and having bandpass characteristics to apply only chrominance signals of the video signals to the respective variable gain circuits.

* * * * *